(12) United States Patent
He et al.

(10) Patent No.: US 6,679,933 B1
(45) Date of Patent: Jan. 20, 2004

(54) LOW RESISTIVITY MATERIALS WITH IMPROVED WEAR PERFORMANCE FOR ELECTRICAL CURRENT TRANSFER AND METHODS FOR PREPARING SAME

(75) Inventors: Da Hai He, 19 Frederick Street, Caulfield South, Victoria (AU), 3162; Rafael R. Manory, 4/485 New Street, Brighton, Victoria (AU), 3186; Norman J. Grady, Melbourne (AU), Harry; Harry Sinkis, Melbourne (AU); Clim Pacheco, Melbourne (AU)

(73) Assignees: Victorian Rail Track, Melbourne (AU); Da Hai He, Caulfield South (AU); Rafael R. Manory, Brighton (AU)

( * ) Notice: Subject to any disclaimer, the term of this patent is extended or adjusted under 35 U.S.C. 154(b) by 0 days.

(21) Appl. No.: 09/857,889

(22) PCT Filed: Dec. 16, 1999

(86) PCT No.: PCT/AU99/01115

§ 371 (c)(1),
(2), (4) Date: Sep. 7, 2001

(87) PCT Pub. No.: WO00/36169

PCT Pub. Date: Jun. 22, 2000

(30) Foreign Application Priority Data

Dec. 16, 1998 (AU) .............................................. PP7739

(51) Int. Cl.⁷ .............................. C22C 9/00; C22C 1/05; B22F 3/12
(52) U.S. Cl. ............................ 75/243; 75/247; 419/31; 419/38; 419/58; 419/59; 419/11
(58) Field of Search .................... 75/243, 247; 419/58, 419/59, 31, 38, 11

(56) References Cited

U.S. PATENT DOCUMENTS

| | | | | |
|---|---|---|---|---|
| 3,661,571 A | | 5/1972 | Hinterman et al. | |
| 4,083,719 A | * | 4/1978 | Arakawa et al. | 75/229 |
| 4,131,460 A | * | 12/1978 | Orford | 419/17 |
| 4,207,096 A | | 6/1980 | Suwa et al. | 75/153 |
| 4,366,361 A | * | 12/1982 | Allen | 219/78.01 |
| 4,541,985 A | * | 9/1985 | Devillard et al. | 419/10 |
| 4,799,957 A | * | 1/1989 | Vogel | 75/243 |
| 4,810,289 A | * | 3/1989 | Hoyer et al. | 75/232 |
| 4,919,717 A | * | 4/1990 | Ambier et al. | 75/228 |
| 5,030,818 A | * | 7/1991 | Dudas | 219/69.12 |
| 5,105,513 A | * | 4/1992 | Marx et al. | 28/263 |
| 5,200,003 A | | 4/1993 | Rohatgi | 148/514 |
| 5,447,681 A | * | 9/1995 | Tai Seung et al. | 419/36 |
| 6,036,839 A | * | 3/2000 | Kohut et al. | 205/574 |
| 6,132,487 A | * | 10/2000 | Mori | 419/1 |
| 6,238,454 B1 | * | 5/2001 | Polese et al. | 419/11 |

FOREIGN PATENT DOCUMENTS

| | | |
|---|---|---|
| DE | 111405 | 2/1975 |
| EP | 0 316 987 A1 | 5/1989 |
| GB | 2 216 543 A | 10/1989 |

OTHER PUBLICATIONS

O. Tatsuo, et al., "Copper–Impregnated Graphite Material", Abstract of JP 9175877A., (Jul. 8, 1997).
O. Noboru, "CU Base Bearing Material", Abstract of JP 5248441A, (Sep. 24, 1993).
T. Yoshikiyo, "Wet Friction Material", Abstract of JP 5032955A, (Feb. 9, 1993).
T. Yoshikiyo, et al., "Wet Friction Material", Abstract of JP4304285A, (Oct. 27, 1992).
Mitsubishi Materials Corp., Sintered Alloy Bearing—Composed of Low Porous Copper–Iron–Tin Alloy Having Ferrite Phase Dispersed in Co pper–Tin Alloy Base, Abstract of JP09041070–A, (Feb. 10, 1997).
Mitsubishi Materials Corp., Sintered Graphite Lubricant Contg. Bearing—is Composed of Porous Copper–Iron–Tin Sintered Alloy Having Ferrite Phase Dispersed in Copper–Tin Alloy Base, Abstract of JP09041071–A, (Feb. 10, 1997).
Patent Abstracts of Japan, vol. 017, No. 798 (C–1147), Dec. 24, 1993 & JP 05 239598 A (Toshiba Corp.), Sep. 17, 1993.
E. Klar (Coordinator): "Metals Handbook—Ninth Edition—vol. 7: Powder Metallurgy," American Society for Metals, pp. 630–636.

* cited by examiner

*Primary Examiner*—Ngoclan Mai
(74) *Attorney, Agent, or Firm*—Finnegan, Henderson, Farabow, Garrett & Dunner LLP

(57) ABSTRACT

A copper graphite composite material suitable for use in applications such as brushes, switches and contact materials for rail systems and other industrial devices. The composite comprises a copper network matrix having a plurality of pores containing graphite. The composite may have an IACS value of at least 40% which may even be higher than 70% and a density value of at least 6.0 g/cm³. The method for preparation of the composite comprises mixing graphite and copper powder under non-oxidising conditions, compacting the mixture and sintering under non-oxidising conditions.

9 Claims, 1 Drawing Sheet

Figure 1:
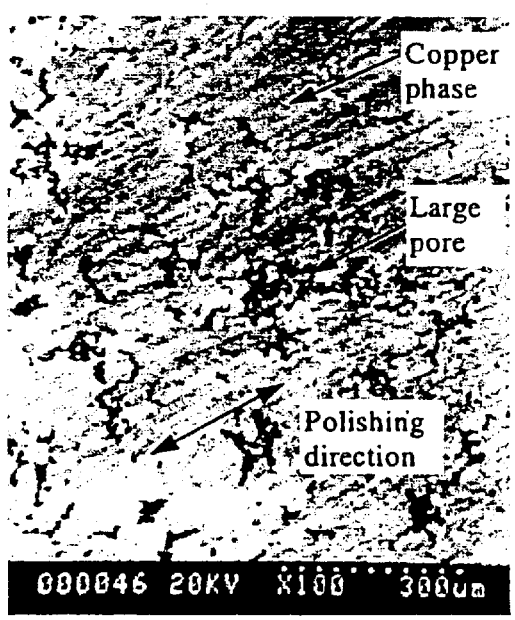

LOW RESISTIVITY MATERIALS WITH IMPROVED WEAR PERFORMANCE FOR ELECTRICAL CURRENT TRANSFER AND METHODS FOR PREPARING SAME

FIELD OF THE INVENTION

The present invention relates to a low resistivity material with improved wear performance for electrical current transfer and methods for preparing same.

In a particular non-limiting aspect, the invention relates to a copper-graphite composite material prepared by a powder metallurgy (P/M) route which shows improved electrical conductivity compared with conventional copper-graphite composite materials, while maintaining higher density than other similarly prepared materials. It also relates to devices and systems including such composites.

BACKGROUND OF THE INVENTION

Carbon composite materials for use in applications such as brushes and contact materials in light rail systems are known. The preparation of these materials may be via P/M techniques. However, currently available materials tend to exhibit either low conductivity or cause excessive wear of counterpart components.

The present invention seeks to provide materials and methods of preparing same which are directed to ameliorating these difficulties significantly.

DISCLOSURE OF THE INVENTION

According to one aspect of the present invention, there is provided a copper-graphite composite material having an IACS value of at least about 40% which has been formed by mixing, compacting and sintering mixtures of copper powder having a purity of about 99.9% and graphite powder, comprising a copper network matrix having a plurality of pores therethrough, at least some of the pores containing graphite to provide a microstructure of graphite islands in a copper network matrix.

The copper-graphite composite material more preferably has an IACS value of at least 45%, and a density of at least about 6.0 g/cm$^3$.

Preferably, the composite materials have a density in the range from about 6.3 to 7.6 g/cm$^3$.

The following explanation of the way in which the invention provides improved performance is offered as a likely mechanism. The invention is not dependent on, nor is it limited by the explanation.

The composite materials according to the invention advantageously exhibit a self lubricating function resulting from the formation of a transfer graphite layer onto the surface of a counterpart component. The self-lubricating function of the copper-graphite composite material effectively protects the counterpart, and thus extends the lifetime of the counterpart. This may advantageously be effective in protecting and extending the lifetime of, for example, railway electrical power transmission systems. More particularly, it is estimated that the lifetime in such an application may be extended by as much as three times relative to currently used materials.

Thus the invention provides in one aspect a material which can be mounted on a pantograph for a railway train such as a pole shoe which includes a copper-graphite composite as hereinafter described as an electrical contact for receiving power from overhead power lines. It also includes power transmission systems using such a composite.

In a preferred embodiment the IACS value of the composite material is at least 60%. As will be understood by a person skilled in the art, the IACS percentage is the standard conductivity (resistivity) used to judge a material's property of conduction based on the International Annealed Copper Standards (IACS).

According to the invention the materials may be prepared by mixing and compacting copper and graphite powders under certain conditions, and then sintering the compacted materials. The various steps of the process may suitably be carried out under non-oxidising conditions, such as under a reducing atmosphere.

According to a further aspect of the invention there is provided a method of preparing a copper-graphite composite material comprising the steps of:

purifying copper powder by annealing copper powder in a reducing atmosphere and cleaning it:
mixing the purified copper powder and a graphite powder;
compacting the mixed powder to produce a compact, and
sintering the compact at elevated temperature for a time sufficient to form the copper-graphite composite material. The copper powder may suitably have a varying particle size of no greater than about 10 µm, and the graphite powder may suitably have a particle size of no greater than about 5 µm.

The conditions may include compacting the well mixed powders using a pressure in the range from about 500 to about 1600 Mpa. They may also include sintering the compacted powder in the form of compacts at a temperature in the range of 960° C. to 1100° C. for a predetermined period under an atmosphere of H$_2$ and N$_2$.

Alternatively the process may include any other process of heating and pressing such as, for example hot isostatic pressing (hipping), isolated hot pressing (IHP) or vacuum sintering.

The compaction of the copper and graphite powders following the mixing step is preferably performed by either two-directional compacting or dynamic compacting. When two-directional compacting is employed, a compressing pressure from about 500 to about 1600 MPa is applied preferably for a period of about 5–10 Minutes. The alternative to this is dynamic compacting. When dynamic compacting is employed, the shock frequency is preferably in the range from about 150 to 250 Hz. Such a shock frequency will achieve a similar result to the application of a constant pressure as described above for the two-directional compacting method.

The copper powder used is advantageously of commercial grade purity or better, and is preferably of about 99.9% purity. The varied particle size of the copper powder facilitates the optimisation of the "particle size effect" on mixing of the copper and graphite powders. For example, copper powder may be used at sizes of 10 micrometers (about 600 mesh) and 40, 150, 200 and 400 mesh. Preferably the particle size of the copper powder ranges between about 5 micrometers and about 150 mesh.

The copper powder is advantageously such that oxides and thinly oxidised films are not present on the particle surfaces. As such, in a preferred embodiment, the copper powder, prior to mixing with the graphite powder, is cleaned and annealed in a controlled atmosphere which is reducing, such as a mixture of hydrogen and nitrogen. Other suitable reducing atmospheres may include carbon monoxide, hydrogen, water reformed natural gas, reducing endothermic or exothermic natural gas mixtures and/or mixtures of these with less reactive gases such as nitrogen. Preferably, this is conducted at a temperature from about 600° C. to about 850° C. It will be readily understood by those skilled in the art that the temperature for cleaning and annealing will depend substantially on the particle size of the copper powder.

The copper powder may also have been treated to remove unwanted impurities. A magnetic separation step may be used for this purpose. Alternatively or additionally, lighter non-magnetic materials may be removed by processes such as electrostatic or centrifugal separation.

In one form of the invention the graphite powder preferably has a particle size of no greater than about 5 μm and preferably has a particle size in the range from about 1 μm to about 2 μm. In a preferred embodiment the graphite powder is electro-grade quality.

As is the case in known P/M processes, other metallurgical powders may be included as additives. These may include, for example, Zn, $MoS_2$ and Si. (Note: the Si additive may be in the form of a silicate.)

As described above, the mixing of the copper and graphite powders is performed under conditions to prevent oxidation of the copper powder. Preferably, the powder mixing is performed at a relatively slow speed, such as about 150 rpm in a conventional mill.

As discussed above, the compacting of the mixed powder is advantageously performed by a two-directional compacting method or a dynamic compacting method. The upper compression pressure of about 1600 Mpa, which may be used in accordance with the present invention is substantially higher than that conventionally used in P/M techniques. This is generally about 690 Mpa. It is worth noting that the pressure here is defined as load/cross sectional area of the compacting die.

The sintering temperature of the sintering step may be in the range from about 960° C. to about 1100° C. The holding time in the furnace will depend on the furnace facilities as would be readily understood by those skilled in the art. The reducing atmosphere used in the sintering step preferably consists of 10% $H_2$ and 90% $N_2$ and provides an exothermic atmosphere in the furnace.

It will be understood that the above process is provided for exemplification only as a preferred method of forming the composite materials of the invention. Other methods may also be employed provided that these produce a composite material having the advantageous characteristics as described herein.

BRIEF DESCRIPTION OF THE ILLUSTRATION

FIG. 1 illustrates the typical microstructure of a copper-graphite composite material prepared in accordance with the invention. As can be seen from the figure, the copper matrix has dispersed therein a number of large pores enclosing graphite islands. As mentioned above, this network of copper with graphite dispersed throughout advantageously provides a substantial improvement in the electrical conductivity of the composite material, and also advantageously supplies graphite which forms a lubricating carbonaceous film between the sliding parts, i.e. the current collectors (contact material) and the electrical contact wires.

Particular embodiments of the present invention will now be described with reference to the following examples. The examples are provided for exemplification only and should not be construed as limiting on the invention in any way.

DETAILED DESCRIPTION OF THE PREFERRED EMBODIMENTS

The following table provides more detailed information on particular embodiments of the composite material prepared in accordance with the invention in terms of chemical composition, physical properties, heat capacities, electrical properties and tribological properties.

The samples in Table 1 were prepared in accordance with the methods described hereinbefore, ie the copper powder having a range of particle sizes of 10 μ, 0.40, 150, 220 and 400 mesh was cleaned by electrostatic and magnetic separation. It was then annealed in a reducing atmosphere of 10% hydrogen and 90% nitrogen.

The copper powder was mixed with other powder components, of which the graphite powder had a particle size range of 1 μm to 2 μm. The mixture was compacted using a two-directional compacting or dynamic compacting approach and the compacted mixture in the form of a compact was sintered for about two hours in a reducing atmosphere at 10% hydrogen and 90% nitrogen. The sintering temperature was in the range 960° C. to 1100° C.

1) Nominal chemical compositions are given in Table 1.

TABLE 1

| Sample No. | Weight proportion in initial mixture (%) | | | | | C.G.C.M. suggested name |
|---|---|---|---|---|---|---|
| | Cu | Graphite | Zinc | $MoS_2$ | Silicate | |
| 1 | 92.0 | 7.0 | — | 0.5 | 0.5 | CuGMnSi |
| 2 | 89.0 | 10.0 | — | — | 1.0 | CuGSi |
| 3 | 87.0 | 11.0 | 1.5 | — | 0.5 | CuG12ZnSi |
| 4 | 85.0 | 15.0 | — | — | — | CuG |
| 5 | 82.0 | 17.5 | — | — | 0.5 | CuGSi |
| 6 | 68.0 | 27.0 | 2.0 | 1.5 | 1.0 | CuGZnMoSi |
| 7 | 80.0 | 15.0 | — | 5.0 | — | CuG15Mo |
| 8 | 78.0 | 16.5 | — | 5.0 | 0.5 | CuG16Mo5Si |
| 9 | 75.0 | 15.0 | — | 10.0 | — | CuG15Mo10 |
| 10 | 70.0 | 23.5 | 2.5 | 4.0 | — | CuG23Mo4Zn |

2) Some measured physical properties are given in Table 2:

TABLE 2

| Sample No. | Density (gr/cm³) | Max Operation Temperature (° C.) | Melting point (° C.) | Coefficient of thermal expansion (×10⁻⁶/° C.) | Thermal conductivity (W/m- ° K) |
|---|---|---|---|---|---|
| 1 | 6.984 | 450 | 1085 | 17.30 | 366 |
| 2 | 7.049 | 450 | 1085 | 16.34 | 354 |
| 3 | 7.545 | 470 | 1085 | 16.02 | 346 |
| 4 | 6.372 | 470 | 1085 | 15.82 | 338 |
| 5 | 6.656 | 480 | 1085 | 15.72 | 326 |
| 6 | 6.163 | 480 | 1100 | 10.65 | 271 |
| 7 | 7.119 | 480 | 1100 | 14.48 | 318 |
| 8 | 6.837 | 480 | 1100 | 13.50 | 310 |
| 9 | 6.370 | 480 | 1100 | 12.24 | 299 |
| 10 | 6.300 | 480 | 1100 | 11.56 | 278 | suggested temperature beyond which it is estimated that the properties deteriotate rapidly.

3) The heat capacities* of CGCM are given in Table 3, as calculated from thermodynamic data.

TABLE 3

| Sample No. | a | b × 10³ | c × 10³ | Temp. range (° K) |
|---|---|---|---|---|
| 1 | 5.285 | 1.388 | −0.158 | 298–1,356 |
| 2 | 5.225 | 1.437 | −0.210 | 298–1,356 |

TABLE 3-continued

| Sample No. | a | b × 10³ | c × 10³ | Temp. range (° K) |
|---|---|---|---|---|
| 3 | 5.207 | 1.431 | −0.252 | 298–1,356 |
| 4 | 5.214 | 1.428 | −0.315 | 298–1,356 |
| 5 | 5.154 | 1.409 | −0.368 | 298–1,356 |
| 6 | 4.973 | 1.379 | −0.567 | 298–1,356 |
| 7 | 5.211 | 1.473 | −0.315 | 298–1,356 |
| 8 | 5.165 | 1.458 | −0.347 | 298–1,356 |
| 9 | 5.064 | 1.429 | −0.378 | 298–1,356 |
| 10 | 5.039 | 1.415 | −0.504 | 298–1,356 |
| Copper | 5.410 | 1.500 | — | 298–1,356 |

Note:
$Cp = a + bT + cT^2$ (Cal/ ° K mole)

4) Compacting stress and mechanical properties are given in Table 4.

TABLE 4

| Sample No. | Compacting stress (MPa) | Compress strength (Mpa) | Modulus of elasticity (Mpa) | Ductility (EL in 1.5 in) (%) | Possion's ratio | Vickers hardness (VH) |
|---|---|---|---|---|---|---|
| 1 | 523 | 200 | 87 | 20 | 0.32 | 78–80 |
| 2 | 523 | 185 | 78 | 18 | 0.28 | 68–86 |
| 3 | 523 | 172 | 60 | 18 | 0.26 | 60–69 |
| 4 | 523 | 175 | 54 | 20 | 0.20 | 60–79 |
| 5 | 523 | 167 | 39 | 17 | 0.31 | 80–90 |
| 6 | 523 | 105 | 28 | 17 | 0.21 | 65–72 |
| 7 | 523 | 150 | 42 | 15 | 0.15 | 70–89 |
| 8 | 523 | 140 | 35 | 14 | 0.18 | 75–82 |
| 9 | 523 | 138 | 32 | 14 | 0.12 | 86–92 |
| 10 | 523 | 120 | 30 | 12 | 0.13 | 58–67 |

Note:
Underlined data are estimated values based on calculation of composite materials properties - ASM, Metals Handbook, - Composite Materials.

5) Electrical properties of these materials were measured and are given in Table 5.

TABLE 5

| Sample No. | Percentage of IACS* (%) | Operating Voltage (V) | Resistivity (μΩcm 20° C.) | Max. current density (amp/mm²) |
|---|---|---|---|---|
| 1 | 65.8 | 600 | 5.05 | 18 |
| 2 | 76.4 | 600 | 4.74 | 20 |
| 3 | 59.0 | 600 | 6.14 | 16 |
| 4 | 69.0 | 600 | 5.25 | 15 |
| 5 | 67.2 | 600 | 5.39 | 15 |
| 6 | 46.8 | 600 | 7.74 | 14 |
| 7 | 64.6 | 600 | 5.60 | 13 |
| 8 | 42.9 | 600 | 8.24 | 13 |
| 9 | 6.19 | 600 | 5.85 | 12 |
| 10 | 43.0 | 600 | 8.42 | 10 |

*Note 1:
The percentage of IACS is the standard conductivity (resistivity) used to judge the material's property of conduction, and is based on the International Annealed Copper Standard (IACS) adopted by IEC in 1913, which states that 1/58 Ω mm²/m and the value of 0.017241 Ω gm mm²/m and the value of 0.15328 Ω gm/m² at 20° C. (68° F.) are, respectively, the international equivalent of volume and weight resistivity of annealed copper equal to 100% conductivity.
Note 2:
Underlined data are estimated values. The current capacity is calculated from the electrical current which can pass through 1 mm² area of material with no damage to that area at maximum operational temperature.

6) Tribological properties

TABLE 6

| Sample No | Wear Factor (×10⁻⁴ K) | Wear Rate (α) | Coefficient of friction (μ) | Layers transferring rate** (10⁻⁷ Å/m) |
|---|---|---|---|---|
| 1 | 1.64 | 9.23 | 0.25 | 3.13 |
| 2 | 1.75 | 9.17 | 0.22–0.26 | — |
| 3 | 1.43 | 9.32 | 0.25 | 4.19 |
| 4 | 2.56 | 14.60 | 0.22–0.26 | — |
| 5 | 1.17 | 5.87 | 0.20–0.24 | — |
| 6 | 1.69 | 10.50 | 0.18–0.21 | — |
| 7 | 1.28 | 7.97 | 0.22 | 2.97 |
| 8 | 1.30 | 7.16 | 0.18–0.21 | — |
| 9 | 9.38 | 45.90 | 0.18 | 3.59 |
| 10 | 10.78 | 52.70 | 0.18 | 6.23 |

*Note 1:
The tribological properties were measured under the conditions of normal load - 13.5 N, sliding velocity 0.25 m/sec and the counterpart metal is pure copper contact wire (after $10^8$ wear cycles).
Note 2:
Double underlined data were obtained on undefined metal (copper) surfaces before wear test.
**Note 3:
The data for rate transfer was measured using a specially designed testing device.

The following table summarises the relevant properties of other materials containing copper and carbon prepared by conventional P/M techniques. It is worth noting that the highest conductivity listed in the table is just above 40% LACS, with the majority of these values being significantly below the LACS values of composite materials prepared in accordance with the materials of the invention, 43% LACS being the lowest value in this respect.

TABLE 7

Commercial materials available for use of electrical contacts

| Composition (%) | Approximate density (g/cm³) | Electrical conductivity (% IACS) | Hardness (HRB) |
|---|---|---|---|
| 30Cu, 70Graphite | 2.5 | 0.11 | 80 |
| 36Cu, 64Graphite | 2.75 | 3 | 75 |
| 40Cu, 60Graphite | 2.75 | 4 | 52 |
| 50Cu, 50Graphite | 3.05 | 2.5 | 35 |
| 62Cu, 38Graphite | 3.65 | 3 | 28 |
| 65Cu, 35Graphite | 3.15 | 3 | 30 |
| 75Cu, 25Graphite | 3.25 | 0.51 | 21 |
| 92Cu, 8Graphite | 7.30 | 41 | 40 |
| 95Cu, 5Graphite | 6.30 | 34 | 38 |
| 96Cu, 4Graphite | 7.75 | 42 | 40 |
| 21Cu, 79C | 2.2 | 0.25 | 28 |
| 35Cu, 65C | 2.5 | 2 | 28 |
| 50Cu, 50C | 2.75 | 5 | 28 |
| 65Cu, 35C | 3.5 | 8 | 20B |
| 75Cu, 25C | 4.0 | 21 | 18 |
| 95Cu, 5C | 7.57 | 40–46 | 38HR15-T |

It is envisaged that the composite materials of the invention may be used as contact brushes for electrical motors, pantographs and pole shoes for light rail applications, power generators and other electrical components such as switches, etc. Furthermore, the particular method of production described above is advantageously relatively simple and economical.

Throughout this specification and the claims which follow, unless the context requires otherwise, the word "comprise", and variations such as "comprises" and "comprising", will be understood to imply the inclusion of a stated integer or group of integers or steps but not the exclusion of any other integer or group of integers or steps.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

What is claimed is:

1. A copper-graphite composite material having an IACS value of at least about 40% and a density of at least about 6.0 g/cm$^3$ which has been formed by mixing, compacting, and sintering mixtures of copper powder having a purity of about 99.9% and graphite powder of particle size not greater than about 5 micrometers, the composite material comprising a copper network matrix having a plurality of pores therethrough, at least some of the pores containing graphite to provide a microstructure of graphite islands in a copper network matrix.

2. A copper-graphite material according to claim 1, wherein the composite has been formed by mixing, compacting, and sintering mixtures of copper and graphite powders and the copper powder has been cleaned and annealed in a controlled atmosphere prior to mixing.

3. A copper-graphite material according to claim 1, wherein the composite has been formed by mixing, compacting, and sintering mixtures of copper and graphite powders, and the copper powder sizing is about 150 mesh.

4. A method of preparing a copper-graphite composite material as defined in claim 1, comprising the steps of:

purifying copper powder by annealing copper powder in a reducing atmosphere and cleaning it;

mixing the purified copper powder and a graphite powder;

compacting the mixed powder to produce a compact; and sintering the compact at elevated temperature for a time sufficient for form the copper-graphite composite material, wherein the compaction is two-directional and the pressure of compaction is in the range from about 500 to about 1600 Mpa.

5. A method of preparing a copper-graphite composite material according to claim 4, wherein the sintering is carried out in a non-oxidizing atmosphere that includes any one or more of carbon monoxide, hydrogen, water reformed natural gas, reducing endothermic or exothermic natural gas mixtures, and/or mixtures of any of these with a less reactive gas.

6. A method of preparing a copper-graphite composite material according to claim 4, wherein the mixed powder is dynamically compacted.

7. A method of preparing a copper-graphite composite material according to claim 4, wherein the mixed powder is dynamically compacted and the shock frequency of dynamic compaction is 150 Hz to 250 Hz.

8. A method of preparing a copper-graphite composite material according to claim 4, wherein the cleaning step includes any one or more of magnetic, electrostatic, or centrifugal separation steps.

9. A method of preparing a copper-graphite composite material according to claim 4, wherein the reducing atmosphere includes any one or more of carbon monoxide, hydrogen, water reformed natural gas, reducing endothermic or exothermic natural gas mixtures, and/or mixtures of any of these with a less reactive gas.

* * * * *